US012693678B2

(12) United States Patent \
Ji et al.

(10) Patent No.: US 12,693,678 B2 \
(45) Date of Patent: Jul. 28, 2026

(54) METHOD AND DEVICE FOR DETERMINING POSITIONS OF NAVIGATION TARGET POINTS AND COMPUTER-READABLE STORAGE MEDIUM

(71) Applicant: UBTECH ROBOTICS CORP LTD, Shenzhen (CN)

(72) Inventors: Jiahao Ji, Shenzhen (CN); Simin Zhang, Shenzhen (CN); Jichao Jiao, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 19/171,392

(22) Filed: Apr. 7, 2025

(65) Prior Publication Data

US 2025/0321583 A1     Oct. 16, 2025

(30) Foreign Application Priority Data

Apr. 15, 2024     (CN) ......................... 202410454201.2

(51) Int. Cl.
| | |
|---|---|
| *G05D 1/246* | (2024.01) |
| *G05D 105/80* | (2024.01) |
| *G06V 10/26* | (2022.01) |
| *G06V 10/30* | (2022.01) |
| *G06V 10/75* | (2022.01) |

(52) U.S. Cl.
CPC .......... *G05D 1/2462* (2024.01); *G06V 10/26* (2022.01); *G06V 10/30* (2022.01); *G06V 10/751* (2022.01); *G05D 2105/87* (2024.01)

(58) Field of Classification Search
None
See application file for complete search history.

(56) References Cited

U.S. PATENT DOCUMENTS

| | | | | |
|---|---|---|---|---|
| 11,720,117 B1 * | 8/2023 | Kim | ..................... | G01C 21/383 |
| | | | | 701/23 |
| 2020/0218289 A1 * | 7/2020 | Gu | ............................. | G06T 7/74 |
| 2024/0085212 A1 * | 3/2024 | Wu | ....................... | G01C 21/383 |
| 2026/0123809 A1 * | 5/2026 | Zhang | ................. | A47L 11/4011 |

* cited by examiner

*Primary Examiner* — Kenneth M Dunne

(57) ABSTRACT

A method for determining positions of navigation target points includes: acquiring an initial map, wherein the initial map represents a plan view corresponding to an explored area; performing contour extraction processing on the explored area to obtain a first contour map corresponding to the explored area, wherein the first contour map includes one or more connecting sections, and the one or more connecting sections are between adjacent ones of a number of sub-areas in the explored area, respectively; performing dilation processing on the first contour map to obtain a second contour map to remove the connecting sections; based on the initial map and the second contour map, extracting at least one navigation target point area from the explored area; and determining the positions of the navigation target points based on connected components corresponding to the at least one navigation target point area.

20 Claims, 13 Drawing Sheets

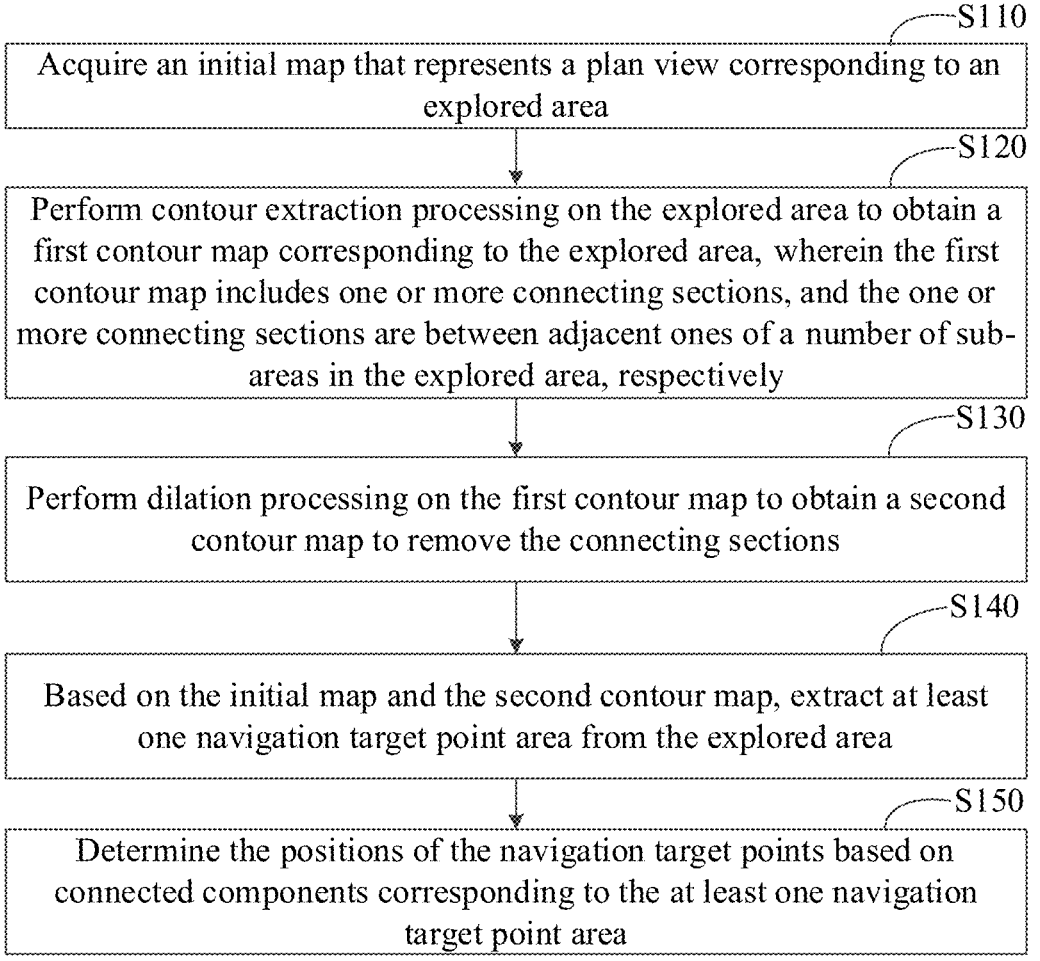

┌─ S110
Acquire an initial map that represents a plan view corresponding to an explored area ┌─ S120
Perform contour extraction processing on the explored area to obtain a first contour map corresponding to the explored area, wherein the first contour map includes one or more connecting sections, and the one or more connecting sections are between adjacent ones of a number of sub-areas in the explored area, respectively ┌─ S130
Perform dilation processing on the first contour map to obtain a second contour map to remove the connecting sections ┌─ S140
Based on the initial map and the second contour map, extract at least one navigation target point area from the explored area ┌─ S150
Determine the positions of the navigation target points based on connected components corresponding to the at least one navigation target point area

FIG. 3

METHOD AND DEVICE FOR DETERMINING POSITIONS OF NAVIGATION TARGET POINTS AND COMPUTER-READABLE STORAGE MEDIUM

CROSS REFERENCE TO RELATED APPLICATIONS

This application claims priority to Chinese Patent Application No. CN 202410454201.2, filed Apr. 15, 2024, which is hereby incorporated by reference herein as if set forth in its entirety.

TECHNICAL FIELD

The present disclosure generally relates to robots, and in particular relates to a method and device for determining positions of navigation target points and computer-readable storage medium.

BACKGROUND

Exploring without a complete map is a common issue in robot navigation and path planning, often referred to as SLAM (Simultaneous Localization and Mapping). In such scenarios, the robot is required to simultaneously localize its own position and construct a map in real-time within an unknown environment.

Currently, the most common method for exploration in the absence of a complete map is to navigate along the longest straight line (following walls) and move to another area (determined by laser features), as illustrated in FIG. 1. In the figure, gray represents unknown regions, white denotes known areas scanned by laser, black indicates obstacles detected by laser points, blue marks the robot's starting position, and green shows the exploration path. During exploration, the robot follows the wall until it reaches a red point, where the robot's laser can scan a location with features entirely different from those at the starting point (blue point). However, the drawbacks of the above approach include a longer time consumption, which consequently reduces navigation efficiency.

Therefore, there is a need to provide a method for determining positions of navigation target points to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

FIG. 3 is an exemplary flowchart of a method for determining positions of navigation target points according to one embodiment.

DETAILED DESCRIPTION

Figure 1:
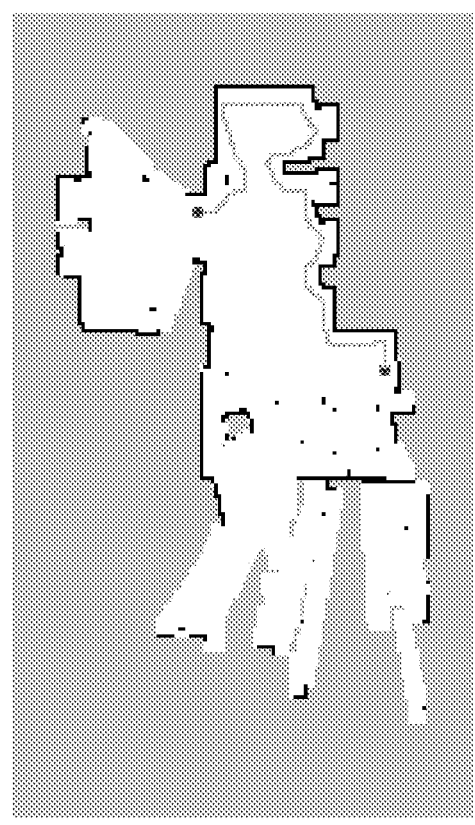
FIG. 1 is a schematic diagram of a conventional method for exploring without a complete map.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

The present disclosure provides a method, device, and storage medium for determining the positions of navigation target points. The device may be a smart phone, a tablet computer, a laptop computer, a desktop computer, a smart speaker, a smart watch, etc., but is not limited thereto.

Figure 2:
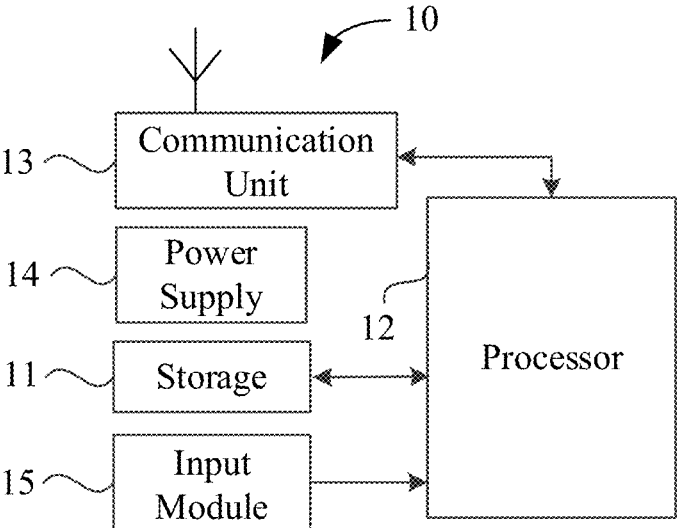
FIG. 2 is a schematic block diagram of a device for determining positions of navigation target points according to one embodiment.

FIG. 2 is a schematic block diagram of a device 10 according to one embodiment. The device 10 may include a storage 11, a processor 12, and a communication unit 13. The storage 11, the processor 12, and the communication unit 13 are electrically connected to each other directly or indirectly to achieve data transmission or interaction. For example, the storage 11, the processor 12, and the communication unit 13 may be electrically connected to each other through one or more communication buses or signal lines. The processor 12 performs corresponding operations by executing the executable computer programs stored in the storage 11. When the processor 12 executes the computer programs, the steps in the embodiments of the method for determining positions of navigation target points, such as steps S110 to S150 in FIG. 3 are implemented.

The processor 12 may be an integrated circuit chip with signal processing capability. The processor 12 may be a central processing unit (CPU), a general-purpose processor, a graphics processing unit (GPU), a network processor (NP), a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 12 can implement or execute the methods, steps, and logical blocks disclosed in the embodiments of the present disclosure.

The processor 12 is the control center of the device 10. It uses various interfaces and lines to connect various parts of the entire device 10. It executes various functions of the device 10 and processes data by running or executing software programs and/or modules stored in the storage 11, and calling data stored in the storage 11, so as to enable comprehensive monitoring of the device 10. In some embodiments, the processor 12 may include one or more processing cores. In some embodiments, the processor 12 may include an application processor and a modem processor. The application processor mainly processes the operating system, user interface, and application programs, and the modem processor mainly processes wireless communications. It should be noted that the above-mentioned modem processor may not be integrated into the processor 12.

The storage 11 may be, but not limited to, a random-access memory (RAM), a read only memory (ROM), a programmable read only memory (PROM), an erasable programmable read-only memory (EPROM), and an electrical erasable programmable read-only memory (EEPROM). The storage 11 may be an internal storage unit of the device 10, such as a hard disk or a memory. The storage 11 may also be an external storage device of the device 10, such as a plug-in hard disk, a smart memory card (SMC), and a secure digital (SD) card, or any suitable flash cards. Furthermore, the storage 11 may also include both an internal storage unit and an external storage device. The storage 11 is to store computer programs, other programs, and data required by the device 10. The storage 11 can also be used to temporarily store data that has been output or is about to be output.

The storage 11 may include a program storage area and a data storage area. The program storage area may store an operating system and an application required for at least one function (such as a sound playback function, an image playback function, etc.). The data storage area may store data created according to the use of the device 10. In addition, the storage 11 may include a high-speed random access memory, and may further include a non-volatile memory, such as at least one disk storage device, a flash memory device, or other volatile solid-state storage devices. Accordingly, the storage 11 may further include a controller to provide the processor 12 with access to the storage 11.

Figure 13:
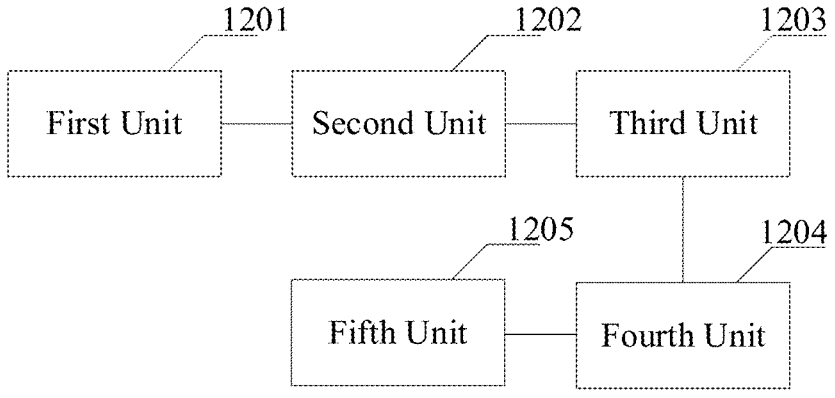
FIG. 13 is a schematic block diagram of a navigation target point determination device according to one embodiment.

Exemplarily, the one or more computer programs stored in the storage 11 may be divided into one or more modules/units, and the one or more modules/units are stored in the storage 11 and executable by the processor 12. The one or more modules/units may be a series of computer program instruction segments capable of performing specific functions, and the instruction segments are used to describe the execution process of the one or more computer programs in the device 10. For example, the one or more computer programs may be divided into a first unit 1201, a second unit 1202, a third unit 1203, a fourth unit 1204, and a fifth unit 1205 as shown in FIG. 13.

The communication unit 13 is to establish a communication connection between the device 10 and other electronic devices through a network, and to send and receive data through the network. The network includes a wired communication network and/or a wireless communication network. In some embodiments, the communication unit 13 may include a wireless module, and the device 10 can perform short-range wireless transmission through the wireless module of the communication unit 13, thereby providing users with wireless broadband Internet access. For example, the communication unit 13 can help users send and receive emails, browse web pages, and access streaming media.

It should be noted that the block diagram shown in FIG. 2 is only an example of the device 10. The device 10 may include more or fewer components than what is shown in FIG. 2 or have a different configuration than what is shown in FIG. 1. Each component shown in FIG. 2 may be implemented in hardware, software, or a combination thereof. For example, the device 10 may further include a includes a power supply 14 for supplying power to various components. In some embodiments, the power supply 14 can be logically connected to the processor 12 through a power management system, so as to manage charging, discharging, and power consumption through the power management system. The power supply 14 can include any components such as one or more DC or AC power supplies, recharging systems, power failure detection circuits, power converters or inverters, and power status indicators. In one embodiment, the device may further include an input module 15, which may receive input digital or character information and generate keyboard, mouse, joystick, optical or trackball signal input related to user settings and function control. Although not shown, the device 10 may further include a display device, which will not be described in detail herein.

FIG. 3 is an exemplary flowchart of a method for determining positions of navigation target points according to one embodiment. In this embodiment, the method for determining positions of navigation target points can be implemented by the device 10. Specifically, the processor 12 of the device 10 will load the executable files corresponding to the processes of one or more applications into the storage 11, and the processor 12 will run the applications stored in the storage 11 to execute the steps of the method. Through the method, the navigation target points can be quickly found without relying on wall lines to explore unknown areas, which facilitates subsequent area mapping or secondary relocation. In one embodiment, the method can include steps S110 to S150.

Step S110: Acquire an initial map that represents a plan view corresponding to an explored area.

In one embodiment, the initial map can be raw image data stored in a cv::Mat data structure. Specifically, the raw image data has been read or loaded into memory and stored as a cv::Mat object. In this object, each pixel of the image can be accessed by row and column indexes, and the type and structure (e.g., grayscale, RGB color, etc.) of pixel values depend on the format of the image.

cv::Mat is a basic data structure in Open Source Computer Vision Library (OpenCV) for storing and manipulating images. The cv::Mat class represents a multidimensional matrix and can be used to store different types of data such as real numbers, complex numbers, characters, etc., but in computer vision, it is most often used to store image data.

Step S120: Perform contour extraction processing on the explored area to obtain a first contour map corresponding to the explored area, wherein the first contour map includes one or more connecting sections, and the one or more connecting sections are between adjacent ones of a number of sub-areas in the explored area, respectively.

In one embodiment, the method may further include performing erosion on the explored area to reduce a width corresponding to each of the one or more connecting sections before performing contour extraction processing on the explored area to obtain the first contour map corresponding to the explored area.

Erosion in images is a morphological operation commonly used in image processing for tasks such as thinning and denoising. The basic principle of the erosion operation involves sliding a small window or template called a structuring element (kernel) and comparing the pixel values within the window with the structuring element. The center pixel retains its original value only if all the pixel values in the window match the structuring element; otherwise, it is set to 0 (or handled differently based on specific requirements).

Specifically, for the explored area in the image, the erosion operation shrinks the edge of the explored area inward and removes edge pixels, thereby reducing the width of the connecting section between each two sub-areas in the explored area. This helps to eliminate small-area noise points, separate adjacent objects, etc.

In one embodiment, step S120 may include steps S121 and S122.

Step S121: Identify a contour of the explored area using a preset edge detection algorithm to obtain contour points corresponding to the explored area.

In one embodiment, a preset edge detection algorithm may be run through a Canny operator to obtain the contour points.

Step S122: Generate the first contour map based on the contour points corresponding to the explored area using a preset contour drawing function.

In one embodiment, the first contour map can be generated according to the contour points corresponding to the explored area by using the drawcountours function of OpenCV and setting the drawing thickness to 2.

Step S130: Perform dilation processing on the first contour map to obtain a second contour map to remove the connecting sections.

In one embodiment, a function in OpenCV may be used, and the kernel size may be set to 13×13 to dilate the first contour map to obtain a second contour map. In the second contour map, there are no connecting sections between the sub-areas.

Step S140: Based on the initial map and the second contour map, extract at least one navigation target point area from the explored area.

In one embodiment, step S140 may include steps S141 to S144.

Step S141: Preprocess the initial map to obtain a first map corresponding to the initial map, wherein the first map represents a feature map corresponding to the explored area.

In one embodiment, step S140 may include steps S1411 and S1412.

Step S1411: Perform noise removal on the initial map to obtain a noise-processed initial map.

In one embodiment, step S1411 may include steps S14111 to S14113.

Step S14111: Perform dilation processing on the initial map using a preset matrix to obtain a first sub-initial map.

In one embodiment, a function of OpenCV can be used to dilate the initial map through a kernel of size 3×3 to obtain the first sub-initial map.

Step S14112: Perform erosion on the first sub-initial map using the preset matrix to obtain a second sub-initial map.

In one embodiment, a function of OpenCV can be used to erode the first sub-initial map through a kernel of size 3×3 to obtain the second sub-initial map.

Step S14113: Merge the first sub-initial map and the second sub-initial map to generate the noise-processed initial map.

Step S1412: Perform binarization processing on the noise-processed initial map to obtain the first map.

In one embodiment, the grayscale image of the noise-processed initial map can be converted into a binary image containing only two pixel values (typically 0 and 255) to highlight the characteristic information of the initial map. Specifically, the following methods can be used.

Global Thresholding Method: The global thresholding method is one of the simplest binarization techniques. It sets a single threshold value, converting pixels in the denoised grayscale initial map to 0 if their pixel values are below the threshold and to 255 if their pixel values equal to or above the threshold. Common global thresholding methods include Otsu's algorithm and the maximum inter-class variance method.

Local Thresholding Method: The local thresholding method accounts for varying lighting conditions across different regions. It divides the denoised initial map into multiple local areas, computes a separate threshold for each region, and performs binarization accordingly, adapting to local illumination variations.

Adaptive Thresholding Method: The adaptive thresholding method combines global and local approaches by dynamically adjusting the threshold for each pixel based on the grayscale values of its neighboring pixels. This enhances robustness to uneven lighting and noise in the denoised initial map.

Gradient-Based Method: Gradient-based binarization calculates the gradient of the denoised initial map, identifying pixels with high gradient magnitudes as target pixels. This emphasizes edges and key features in the noise-processed initial map.

Clustering-Based Method: Clustering-based binarization groups pixels in the denoised initial map into two classes (e.g., foreground and background) using clustering algorithms such as K-means. The resulting segmentation produces a binary image, i.e., the first map.

Step S142: Performing pixel-by-pixel subtraction processing on the first map and the second contour map to obtain a difference image.

Step S143: Traverse the difference image to remove pixels in the difference image whose difference is not a preset pixel value to obtain remaining pixels.

In one embodiment, the preset pixel value can be set to 255.

Step S144: Generate the at least one navigation target point area based on the remaining pixels.

Step S150: Determine the positions of the navigation target points based on connected components corresponding to the at least one navigation target point area. In one embodiment, step S150 may include steps S151 to S153.

Step S151: Determine an area corresponding to each of the connected components in the at least one navigation target point area.

In one embodiment, connected components refer to regions in an image (or a binary image) composed of adjacent pixels sharing the same pixel value. In connected component analysis, pixels with the same value that are adjacent to each other are grouped into a single connected component. Specifically, in a binary image, pixels with a value of 1 represent foreground target objects, while pixels with a value of 0 denote the background. Connected component analysis identifies distinct objects in the image and assigns each to a separate connected component. Each connected component typically consists of a set of neighboring pixels connected horizontally, vertically, or diagonally.

Step S152: Calculate a centroid of the area corresponding to each of the connected components.

In one embodiment, calculating the centroid of the area corresponding to a connected component may include the following methods.

Geometric Center Method: Compute the average coordinates of all pixels within the connected component—i.e., sum all pixel coordinates and divide by the total number of pixels—to derive the centroid coordinates.

Weighted Centroid Method: Use the grayscale or brightness value of each pixel as a weight to calculate a weighted average to determine the centroid. This approach takes into account the brightness information of pixels and is suitable for grayscale or color images.

Minimum Bounding Rectangle (MBR) Method: Fit the connected component to the minimum circumscribed rectangle and then take the center of the rectangle as the centroid. This method is suitable for connected components with rectangular or approximately rectangular shapes.

Moment of Inertia Method: Determine the centroid by computing the second-order moments of the connected component, incorporating both shape and spatial distribution.

Shape Matching Method: Match the connected domain with a standard shape (e.g., circle, ellipse) to obtain the best fitting shape parameters to determine the centroid. This method is suitable for situations where the shape of the connected domain needs to be accurately described.

Step S153: Determine a position of the centroid of the area corresponding to each of the connected components as one of the positions of the navigation target points.

In one embodiment, by determining the positions of the navigation target points, it is convenient for a robot to explore unknown areas in the future. That is, after the positions of the navigation target points have been determined, the device 10 can control a robot to explore unknown areas based on the positions of the navigation target points.

In summary, the method described above enables rapid identification of navigation target points within explored areas without relying on wall-following exploration of unknown regions, thereby facilitating subsequent mapping of unexplored areas and re-localization tasks.

The present disclosure is further illustrated below through a specific embodiment. To enable users to quickly locate navigation target points within explored areas without relying on wall-following exploration of unknown regions, the following steps are implemented.

Figure 4:
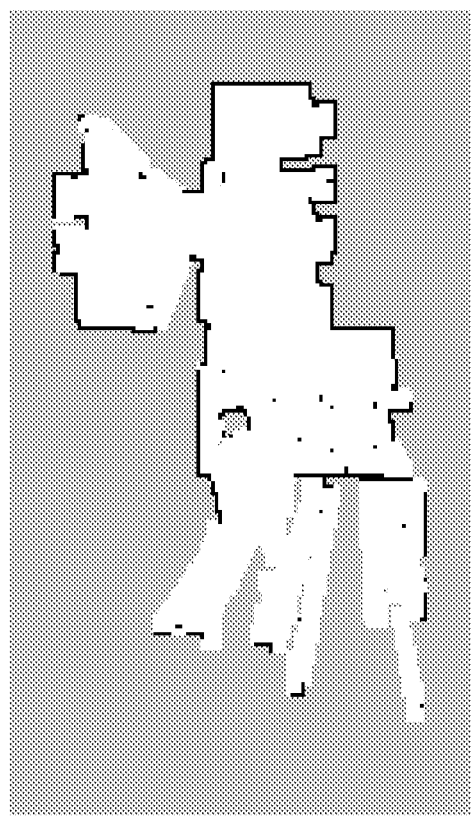
FIG. 4 is a schematic diagram of an initial map according to one embodiment.

Step 1: Acquire the initial map in cv::Mat format, as shown in FIG. 4.

Figure 5:
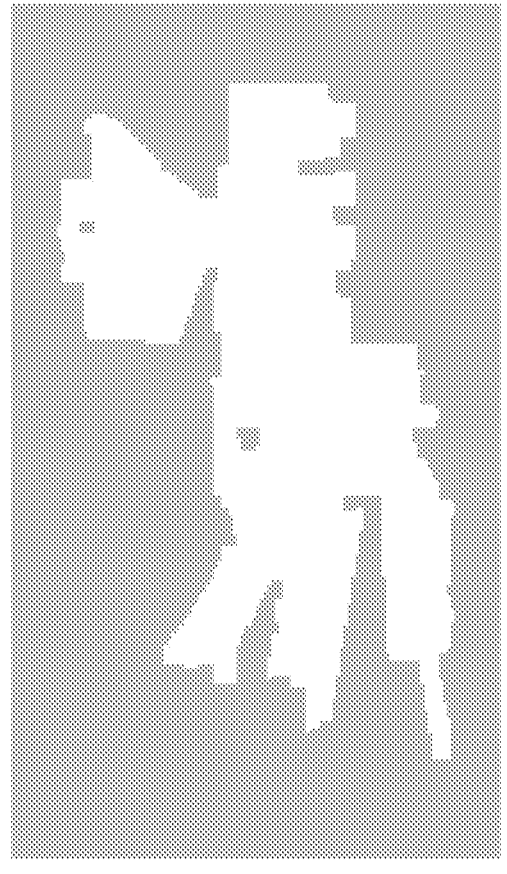
FIG. 5 is a schematic diagram of a noise-processed initial map according to one embodiment.

Step 2: Perform a dilation and erosion operation to remove noise (e.g., using OpenCV functions with a 3×3 kernel size), obtaining FIG. 5, which shows the noise-processed initial map mentioned previously. The purpose of this step is to remove noise that could affect the segmentation results.

Figure 6:
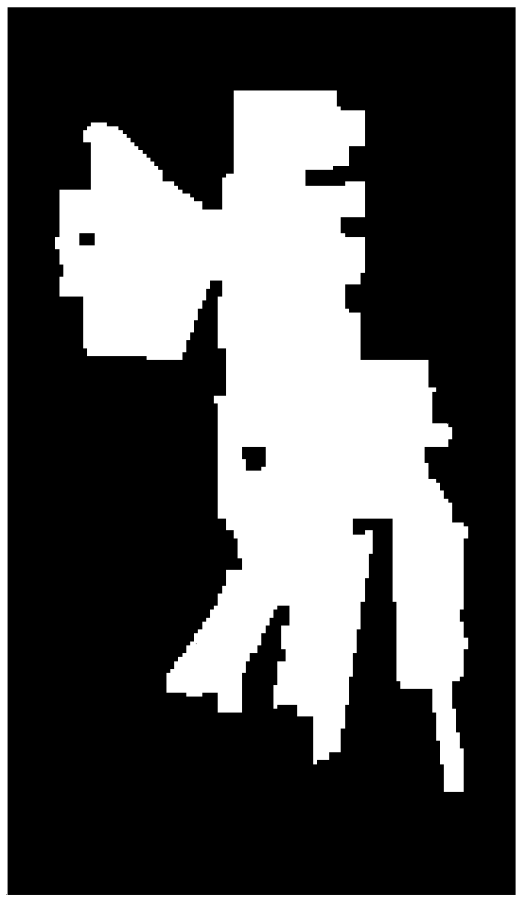
FIG. 6 shows a processing result corresponding to step 3 of an embodiment of the present disclosure.

Step 3: Process the noise-processed initial map in FIG. 5 using binarization to obtain a map of FIG. 6.

Figure 7:
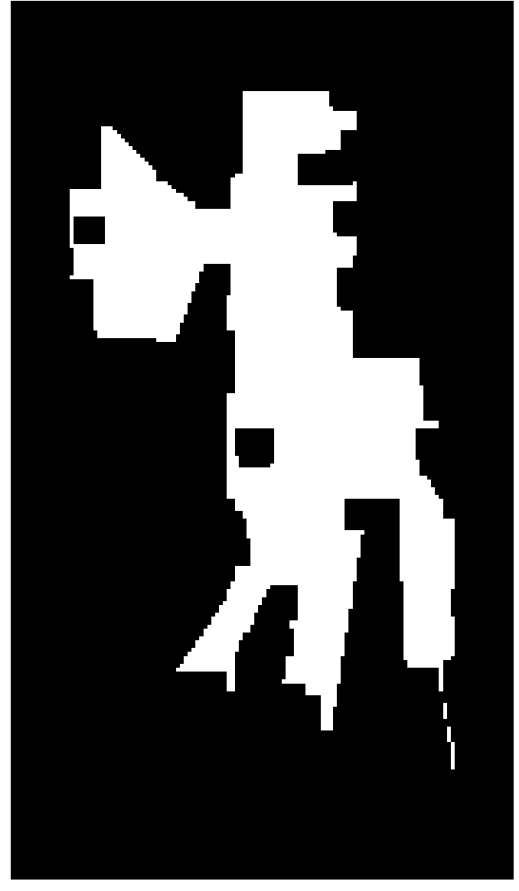
FIG. 7 shows a processing result corresponding to step 4 of an embodiment of the present disclosure.

Step 4: Perform an erosion operation on the map of FIG. 6 (using a 5×5 kernel size when implementing with OpenCV functions) to obtain a map of FIG. 7. The purpose of this step is to further reduce the spacing between connecting sections between the sub-areas, i.e., to narrow the width mentioned previously.

Figure 8:
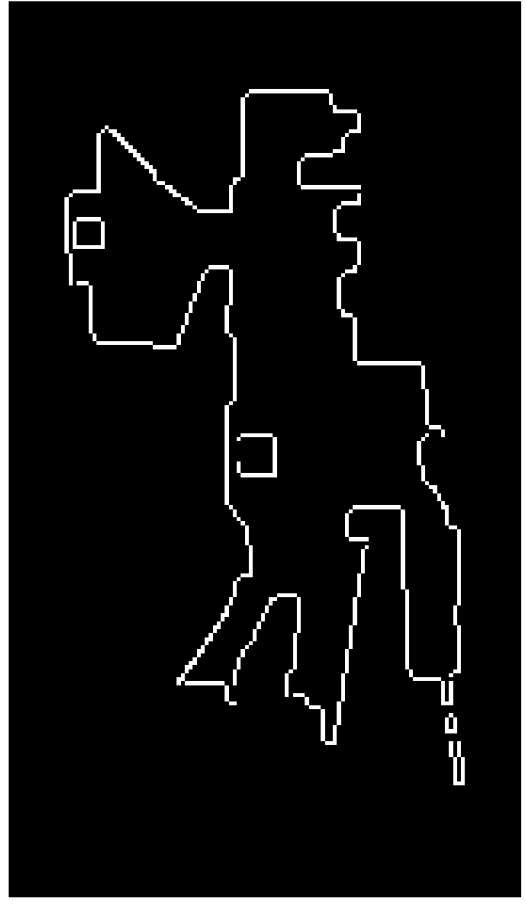
FIG. 8 shows a processing result corresponding to step 5 of an embodiment of the present disclosure.

Step 5: Perform edge detection using the Canny operator to obtain the contour points of the map, obtaining the map of FIG. 8.

Figure 9:
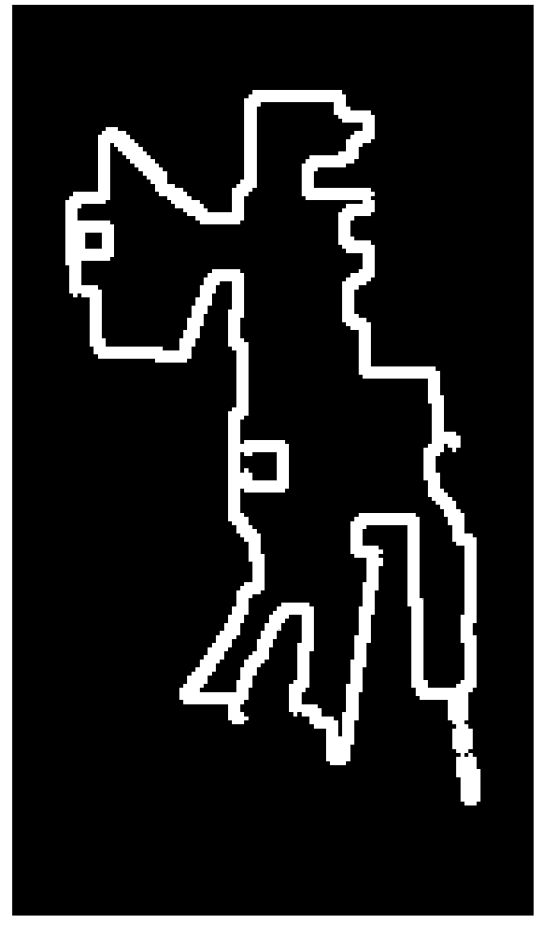
FIG. 9 shows a processing result corresponding to step 6 of an embodiment of the present disclosure.

Step 6: Draw, using OpenCV's drawContours function with thickness set to 2, according to the contour points, obtaining the map of FIG. 9.

Figure 10:
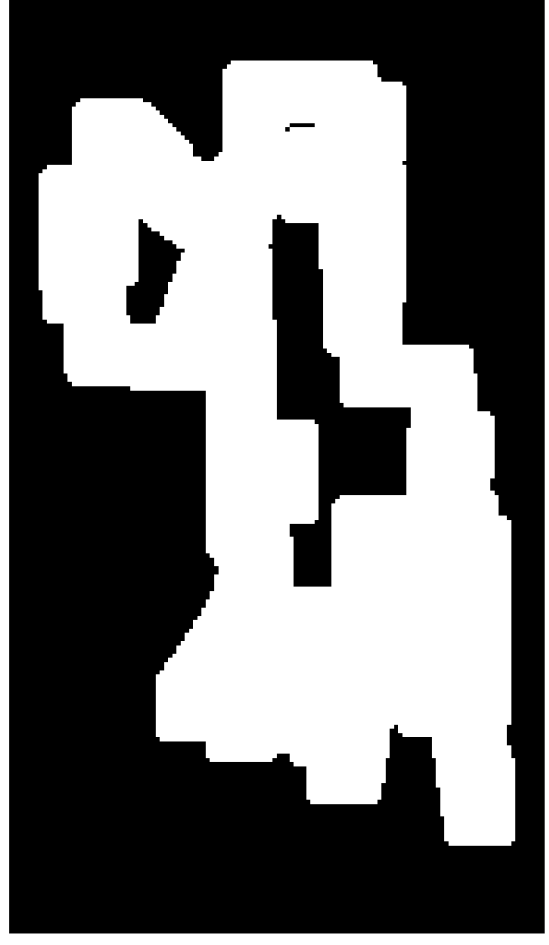
FIG. 10 shows a processing result corresponding to step 7 of an embodiment of the present disclosure.

Step 7: Dilate the contour in FIG. 9 using an OpenCV function with kernel size set to 13×13, obtaining the map of FIG. 10. The purpose of this step is to eliminate connecting sections between sub-areas through dilation, thereby segmenting the target areas.

Figure 11:
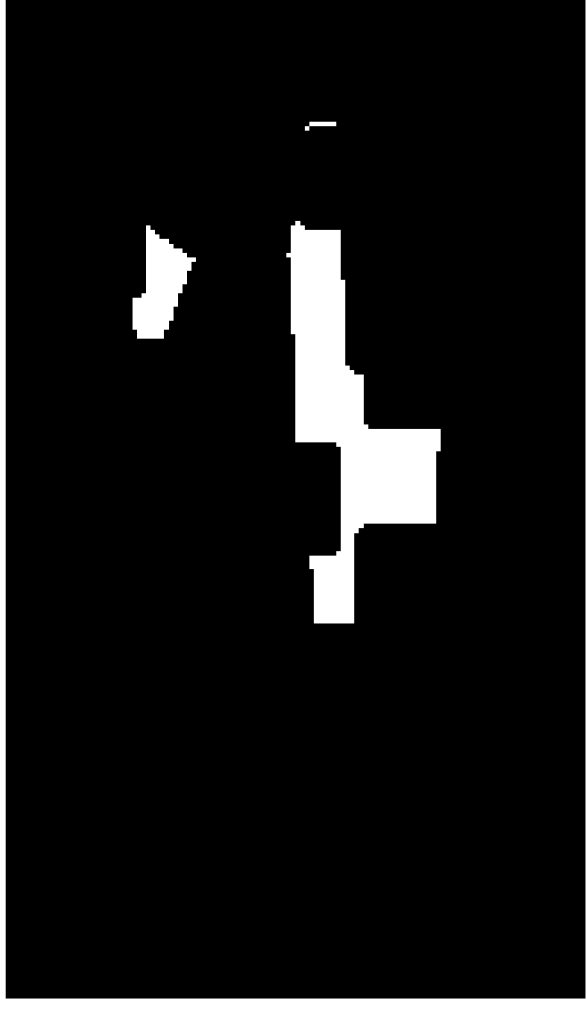
FIG. 11 shows a processing result corresponding to step 8 of an embodiment of the present disclosure.

Step 8: Subtract the map of FIG. 10 from the map of FIG. 5 and retain the portions with a difference value of 255 to obtain the navigation target point areas shown in FIG. 11, that is, the white portions in FIG. 11.

Figure 12:
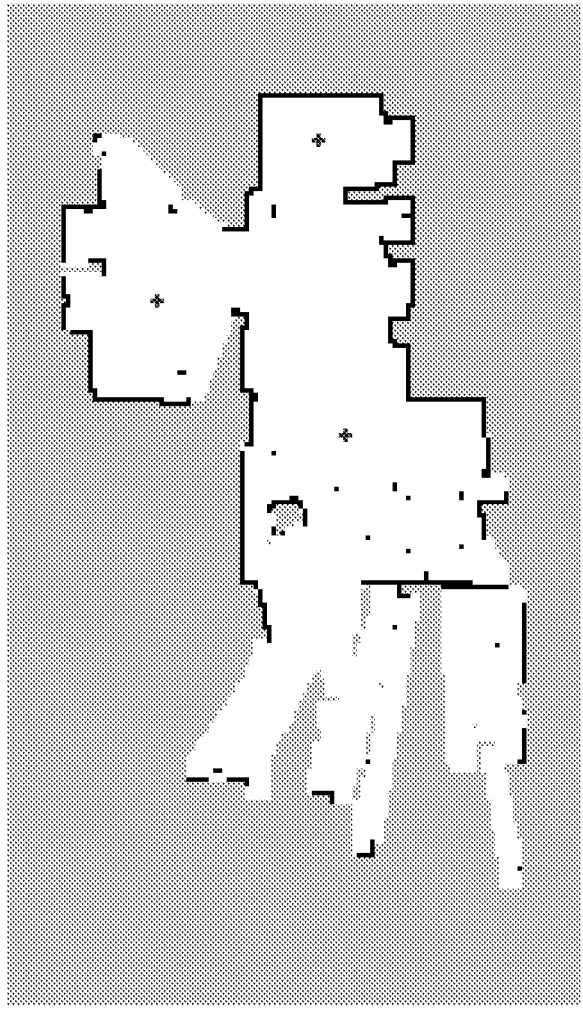
FIG. 12 shows a processing result corresponding to step 9 of an embodiment of the present disclosure.

Step 9: Determine the range of the connected components in FIG. 11, calculate the centroid of the range corresponding to each connected component, determine the positions of the centroids as the positions of the navigation target points, and mark the navigation target points in FIG. 4 to obtain FIG. 12.

Step 10: Verify the navigation target points using the breadth-first search (BFS) algorithm to determine whether they can be reached from the robot's current position and retain the navigation target points that can be reached by the robot.

At this point, the search for the navigation target points has been completed. These navigation target points can be explored sequentially in ascending order of distance from the robot's current position.

In summary, the method for determining positions of navigation target points of an embodiment operates to: acquire an initial map, wherein the initial map represents a plan view corresponding to an explored area; perform contour extraction processing on the explored area to obtain a first contour map corresponding to the explored area, wherein the first contour map includes one or more connecting sections, and the one or more connecting sections are between adjacent ones of a number of sub-areas in the explored area, respectively; perform dilation processing on the first contour map to obtain a second contour map to remove the connecting sections; based on the initial map and the second contour map, extract at least one navigation target point area from the explored area; and determine the positions of the navigation target points based on connected components corresponding to the at least one navigation target point area.

The present disclosure provides a method for determining positions of navigation target points, which enables rapid identification of navigation target points without relying on wall-following exploration of unknown areas, thereby facilitating subsequent operations including area mapping and re-localization.

It should be understood that sequence numbers of the foregoing processes do not mean an execution sequence in the above-mentioned embodiments. The execution sequence of the processes should be determined according to functions and internal logic of the processes and should not be construed as any limitation on the implementation processes of the above-mentioned embodiments.

The present disclosure further provides a navigation target point determination device, which can be integrated in an electronic device, which can be a terminal, a server, or other device. The electronic device can be a mobile phone, a tablet computer, a smart Bluetooth device, a laptop, a personal computer, or other devices; the server can be a single server or a server cluster composed of multiple servers. In one embodiment, the server can be implemented in the form of a terminal. The server can be an independent physical server, or a server cluster or distributed system composed of multiple physical servers, or a cloud server that provides basic cloud computing services such as cloud services, cloud databases, cloud computing, cloud functions, cloud storage, network services, cloud communications, middleware services, domain name services, security services, content delivery network (CDN), and big data and artificial intelligence platforms. The electronic device and the server may be directly or indirectly connected via wired or wireless communication, which is not limited in the present disclosure.

In one embodiment, the method discussed above will be described in detail by taking as an example the specific integration of the navigation target point determination device within the electronic device. For example, as shown in FIG. 13, the avigation target point determination device may include a first unit 1201, a second unit 1202, a third unit 1203, a fourth unit 1204 and a fifth unit 1205.

The first unit 1201 is to acquire an initial map. The initial map represents a plan view corresponding to an explored area. The second unit 1202 is to perform contour extraction processing on the explored area to obtain a first contour map corresponding to the explored area. The first contour map includes one or more connecting sections, and the one or more connecting sections are between adjacent ones of a number of sub-areas in the explored area, respectively. The third unit 1203 is to perform dilation processing on the first contour map to obtain a second contour map to remove the connecting sections. The fourth unit 1204 is to, based on the initial map and the second contour map, extract at least one navigation target point area from the explored area. The fifth unit 1205 is to determine the positions of the navigation target points based on connected components corresponding to the at least one navigation target point area.

Each aforementioned unit may be implemented as an independent entity or combined in any configuration as one or multiple integrated entities. For specific implementations of these units, reference may be made to the preceding method embodiments, which will not be reiterated herein.

The avigation target point determination device enables rapid identification of navigation target points without relying on wall-following exploration of unknown areas, thereby facilitating subsequent operations including area mapping and re-localization.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality, and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manners may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices, or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for determining positions of navigation target points, the method comprising:
    acquiring an initial map, wherein the initial map represents a plan view corresponding to an explored area;
    performing contour extraction processing on the explored area to obtain a first contour map corresponding to the explored area, wherein the first contour map comprises one or more connecting sections, and the one or more connecting sections are between adjacent ones of a plurality of sub-areas in the explored area, respectively;
    performing dilation processing on the first contour map to obtain a second contour map to remove the connecting sections;
    based on the initial map and the second contour map, extracting at least one navigation target point area from the explored area; and
    determining the positions of the navigation target points based on connected components corresponding to the at least one navigation target point area.

2. The method of claim 1, further comprising, before performing contour extraction processing on the explored area to obtain the first contour map corresponding to the explored area,
    performing erosion on the explored area to reduce a width corresponding to each of the one or more connecting sections.

3. The method of claim 1, wherein performing contour extraction processing on the explored area to obtain the first contour map corresponding to the explored area comprises:
    identifying a contour of the explored area using a preset edge detection algorithm to obtain contour points corresponding to the explored area; and
    generating the first contour map based on the contour points corresponding to the explored area using a preset contour drawing function.

4. The method of claim 1, wherein extracting at least one navigation target point area from the explored area based on the initial map and the second contour map comprises:
    preprocessing the initial map to obtain a first map corresponding to the initial map, wherein the first map represents a feature map corresponding to the explored area;
    performing pixel-by-pixel subtraction processing on the first map and the second contour map to obtain a difference image;
    traversing the difference image to remove pixels in the difference image whose difference is not a preset pixel value to obtain remaining pixels; and
    generating the at least one navigation target point area based on the remaining pixels.

5. The method of claim 4, wherein preprocessing the initial map to obtain the first map corresponding to the initial map comprises:

performing noise removal on the initial map to obtain a noise-processed initial map; and performing binarization processing on the noise-processed initial map to obtain the first map.

6. The method of claim 5, wherein performing noise removal on the initial map to obtain the noise-processed initial map comprises:

performing dilation processing on the initial map using a preset matrix to obtain a first sub-initial map;

performing erosion on the first sub-initial map using the preset matrix to obtain a second sub-initial map; and merging the first sub-initial map and the second sub-initial map to generate the noise-processed initial map.

7. The method of claim 1, wherein determining the positions of the navigation target points based on connected components corresponding to the at least one navigation target point area comprises:

determining an area corresponding to each of the connected components in the at least one navigation target point area;

calculating a centroid of the area corresponding to each of the connected components; and determining a position of the centroid of the area corresponding to each of the connected components as one of the positions of the navigation target points.

8. A device comprising:

one or more processors; and a memory coupled to the one or more processors, the memory storing programs that, when executed by the one or more processors, cause performance of operations comprising:

acquiring an initial map, wherein the initial map represents a plan view corresponding to an explored area;

performing contour extraction processing on the explored area to obtain a first contour map corresponding to the explored area, wherein the first contour map comprises one or more connecting sections, and the one or more connecting sections are between adjacent ones of a plurality of sub-areas in the explored area, respectively;

performing dilation processing on the first contour map to obtain a second contour map to remove the connecting sections;

based on the initial map and the second contour map, extracting at least one navigation target point area from the explored area; and determining positions of navigation target points based on connected components corresponding to the at least one navigation target point area.

9. The device of claim 8, wherein the operations further comprise, before performing contour extraction processing on the explored area to obtain the first contour map corresponding to the explored area, performing erosion on the explored area to reduce a width corresponding to each of the one or more connecting sections.

10. The device of claim 8, wherein performing contour extraction processing on the explored area to obtain the first contour map corresponding to the explored area comprises:

identifying a contour of the explored area using a preset edge detection algorithm to obtain contour points corresponding to the explored area; and generating the first contour map based on the contour points corresponding to the explored area using a preset contour drawing function.

11. The device of claim 8, wherein extracting at least one navigation target point area from the explored area based on the initial map and the second contour map comprises:

preprocessing the initial map to obtain a first map corresponding to the initial map, wherein the first map represents a feature map corresponding to the explored area;

performing pixel-by-pixel subtraction processing on the first map and the second contour map to obtain a difference image;

traversing the difference image to remove pixels in the difference image whose difference is not a preset pixel value to obtain remaining pixels; and generating the at least one navigation target point area based on the remaining pixels.

12. The device of claim 11, wherein preprocessing the initial map to obtain the first map corresponding to the initial map comprises:

performing noise removal on the initial map to obtain a noise-processed initial map; and performing binarization processing on the noise-processed initial map to obtain the first map.

13. The device of claim 12, wherein performing noise removal on the initial map to obtain the noise-processed initial map comprises:

performing dilation processing on the initial map using a preset matrix to obtain a first sub-initial map;

performing erosion on the first sub-initial map using the preset matrix to obtain a second sub-initial map; and merging the first sub-initial map and the second sub-initial map to generate the noise-processed initial map.

14. The device of claim 8, wherein determining the positions of the navigation target points based on connected components corresponding to the at least one navigation target point area comprises:

determining an area corresponding to each of the connected components in the at least one navigation target point area;

calculating a centroid of the area corresponding to each of the connected components; and determining a position of the centroid of the area corresponding to each of the connected components as one of the positions of the navigation target points.

15. A non-transitory computer-readable storage medium storing instructions that, when executed by at least one processor of a device, cause the at least one processor to perform a method for determining positions of navigation target points, the method comprising:

acquiring an initial map, wherein the initial map represents a plan view corresponding to an explored area;

performing contour extraction processing on the explored area to obtain a first contour map corresponding to the explored area, wherein the first contour map comprises one or more connecting sections, and the one or more connecting sections are between adjacent ones of a plurality of sub-areas in the explored area, respectively;

performing dilation processing on the first contour map to obtain a second contour map to remove the connecting sections;

based on the initial map and the second contour map, extracting at least one navigation target point area from the explored area; and determining the positions of the navigation target points based on connected components corresponding to the at least one navigation target point area.

16. The non-transitory computer-readable storage medium of claim 15, wherein the method further comprises, before performing contour extraction processing on the explored area to obtain the first contour map corresponding to the explored area, performing erosion on the explored area to reduce a width corresponding to each of the one or more connecting sections.

17. The non-transitory computer-readable storage medium of claim 15, wherein performing contour extraction processing on the explored area to obtain the first contour map corresponding to the explored area comprises:

identifying a contour of the explored area using a preset edge detection algorithm to obtain contour points corresponding to the explored area; and generating the first contour map based on the contour points corresponding to the explored area using a preset contour drawing function.

18. The non-transitory computer-readable storage medium of claim 15, wherein extracting at least one navigation target point area from the explored area based on the initial map and the second contour map comprises:

preprocessing the initial map to obtain a first map corresponding to the initial map, wherein the first map represents a feature map corresponding to the explored area;

performing pixel-by-pixel subtraction processing on the first map and the second contour map to obtain a difference image;

traversing the difference image to remove pixels in the difference image whose difference is not a preset pixel value to obtain remaining pixels; and generating the at least one navigation target point area based on the remaining pixels.

19. The non-transitory computer-readable storage medium of claim 18, wherein preprocessing the initial map to obtain the first map corresponding to the initial map comprises:

performing noise removal on the initial map to obtain a noise-processed initial map; and performing binarization processing on the noise-processed initial map to obtain the first map.

20. The non-transitory computer-readable storage medium of claim 19, wherein performing noise removal on the initial map to obtain the noise-processed initial map comprises:

performing dilation processing on the initial map using a preset matrix to obtain a first sub-initial map;

performing erosion on the first sub-initial map using the preset matrix to obtain a second sub-initial map; and merging the first sub-initial map and the second sub-initial map to generate the noise-processed initial map.

* * * * *